US005126547A

United States Patent [19]

Norman, Jr.

[11] Patent Number: 5,126,547

[45] Date of Patent: Jun. 30, 1992

[54] ENCODABLE STRIP ASSEMBLY WITH UNOBSTRUCTED ENCODABLE BAND PORTION ADHESIVELY ATTACHABLE BY NARROW ADHESIVE BEARING STRIP SOLELY AT FRONT FACE OF CHECK TO PROVIDE AUXILIARY MICR ENCODABLY SURFACE

[75] Inventor: Thomas J. Norman, Jr., Richardson, Tex.

[73] Assignee: BancTec, Inc., Dallas, Tex.

[21] Appl. No.: 515,880

[22] Filed: Apr. 27, 1990

[51] Int. Cl.[5] ..................... G06K 19/00; G06K 19/02; G06K 19/06

[52] U.S. Cl. .................................... 235/487; 235/488; 235/493

[58] Field of Search ........................ 235/487, 488, 493

[56] References Cited

U.S. PATENT DOCUMENTS

| | | | |
|---|---|---|---|
| 3,363,917 | 1/1968 | Gunderson et al. | 235/487 |
| 3,576,972 | 5/1971 | Wood | 235/487 |
| 3,586,834 | 6/1971 | Dykaar et al. | 235/487 |
| 3,702,924 | 11/1972 | Wood et al. | 235/487 |
| 3,770,943 | 11/1973 | Sill | 235/487 |
| 3,800,124 | 3/1974 | Walsh | 235/488 |
| 4,060,711 | 11/1977 | Buros | 235/488 |
| 4,128,202 | 12/1978 | Buros | 235/493 |
| 4,278,880 | 7/1981 | Buros | 235/487 |

*Primary Examiner*—Stuart S. Levy
*Assistant Examiner*—Christopher R. Glembocki

[57] ABSTRACT

A correction strip assembly attachable to a check or similar document for providing an auxiliary encodable band for receiving encoded indicia to replace or supplement the encoded indicia on the check. The correction strip assembly is attached at the front of the check by way of a thin, tearable heat activatable adhesive bearing strip which width is maintained to avoid extension into either the encoded data field on the check or the encoding zone on the auxiliary band. A weakening device is provided to facilitate the removal of the band after processing.

11 Claims, 1 Drawing Sheet

ENCODABLE STRIP ASSEMBLY WITH UNOBSTRUCTED ENCODABLE BAND PORTION ADHESIVELY ATTACHABLE BY NARROW ADHESIVE BEARING STRIP SOLELY AT FRONT FACE OF CHECK TO PROVIDE AUXILIARY MICR ENCODABLY SURFACE

FIELD OF THE INVENTION

This invention relates generally to document processing, more particularly to commercial document processing, and even more particularly to an improved correction strip assembly for removable attachment to checks or other documents to enable reencoding and additions of MICR or other encoded data.

BACKGROUND OF THE INVENTION

It is well known that the proliferation of transfer of fund instruments, such as checks, drafts, credit card receipts and the like have resulted in the development of computerized equipment which automatically handles, sorts, and processes these instruments and the information thereon. In such applications, the transfer of fund instruments are initially encoded with machine readable indicia, one common form being referred to as Magnetic Ink Character Recognition, or MICR, data, corresponding to the information relevant to such instruments. The computerized equipment then automatically scans the instruments, "reads" the MICR data, and processes the documents and data in response thereto.

Although this development has been instrumental in increasing the speed and efficiency of handling and processing commercial documents, it has not been free of difficulties. For example, many commercial instruments, such as checks, are often defaced, mutilated, improperly encoded, or the MICR data is otherwise rendered unsuitable for processing, and the instruments will consequently be rejected by the automatic processing equipment. To overcome such problem, various techniques have been devised for modifying or "correcting" the check to enable its automatic processing, many of which being directed to the attachment or association of an auxiliary encodable sheet or band with the check, the auxiliary encodable band providing an additional area or surface for receiving new encoded indicia to replace or supplement the indicia on the check.

DESCRIPTION OF THE PRIOR ART

Various types of assemblies and methods have been used for providing this auxiliary encodable band. For example, U.S. Pat. No. 3,576,972 (Wood); U.S. Pat. No. 3,800,124 (Walsh); U.S. Pat. No. 4,060,711 (Buros); and U.S. Pat. No. 4,128,202 (Buros) are typical of envelope carrier type constructions providing this auxiliary encodable area. U.S. Pat. No. 3,363,917 (Gunderson et al) and U.S. Pat. No. 3,702,924 (Wood et al) provide such auxiliary encodable band by enlarged rectangular or horseshoe shaped sheets adhesively affixed to the back of the check. U.S. Pat. No. 3,586,834 (Dykaar) and U.S. Pat. No. 4,278,880 (Buros) provide the auxiliary encodable surface by way of strips attachable by pressure sensitive adhesive at the rear and bottom of the check.

One type of correction strip assembly to which this invention is directed to improve is disclosed in U.S. Pat. No. 3,770,943 (Sill), such patent being assigned to the assignee of the present invention. Specifically, and in accordance with its teachings, the encodable band is positioned at the bottom of the check by way of a thin heat-activatable adhesive bearing strip which attaches to the back surface of the check, the resulting assembly providing a "stepped" configuration which substantially aligns the encodable band surface with the face of the check with a minimal total add-on thickness. The adhesive bearing strip is extremely thin, easily tearable, with the heat activatable adhesive being effective to enable quick and accurate alignment and attachment of the correction band with the check.

While correction strips produced in accordance with the teachings of the '943 patent have met wide and enthusiastic acceptance in the banking industry, certain disadvantages have arisen due to their construction. For example, it has been found that the adhesive bearing strip, which extends the full width of the encodable band portion, tends to interfere with and degrade the MICR encoding on the face of the encodable band. Furthermore, this adhesive strip hinders the printing on the entire back surface of the check, for purposes such as endorsement, audit trail, etc., due in part to its highly calendered and nonabsorbent surface character. This difficulty is particularly acute when the printing is to be effected by ink jet printers. In addition, during the high speed processing of the check-correction strip combination, the encodable band has exhibited a tendency to shear away from the leading edge of such combination.

OBJECTS OF THE INVENTION

It is therefore a principal object of the present invention to provide a new and improved correction strip assembly which, due to its construction and method of attachment, provides an effective method of auxiliary encoding while, at the same time, does not interfere with required encoding, printing and processing operations.

It is another object of the invention to provide such an improved correction strip assembly having the additional desirable features of means for assuring accurate alignment and attachment of the correction strips with the document, as well as easy removability of such assembly from the document after processing.

It is a still further object of the invention to provide such an improved correction strip assembly which is furthermore simple and inexpensive to manufacture, use, and apply.

SUMMARY OF THE INVENTION

In accordance with these and other objects, the present invention is directed to a correction strip assembly comprising an integrally formed encodable band portion and a thin, tearable heat-activatable adhesive bearing strip attachable to the front, rather than the back, of the check. The width of the heat activatable strip is such as to not extend downwardly into the MICR print zone on the face of the encodable band, as well as to not extend upwardly into the MICR encoding field on the check.

Additional features of the invention, as well as further objects and advantages thereof, will become more readily understood by reference to the following detailed description taken in conjunction with the accompanying drawings, in which like reference numerals designate like or corresponding parts.

The drawings are not necessarily to scale and in some instances the dimensions of the strip assembly have been exaggerated in order to emphasize its various features.

DETAILED DESCRIPTION OF PREFERRED EMBODIMENT

Figure 1:
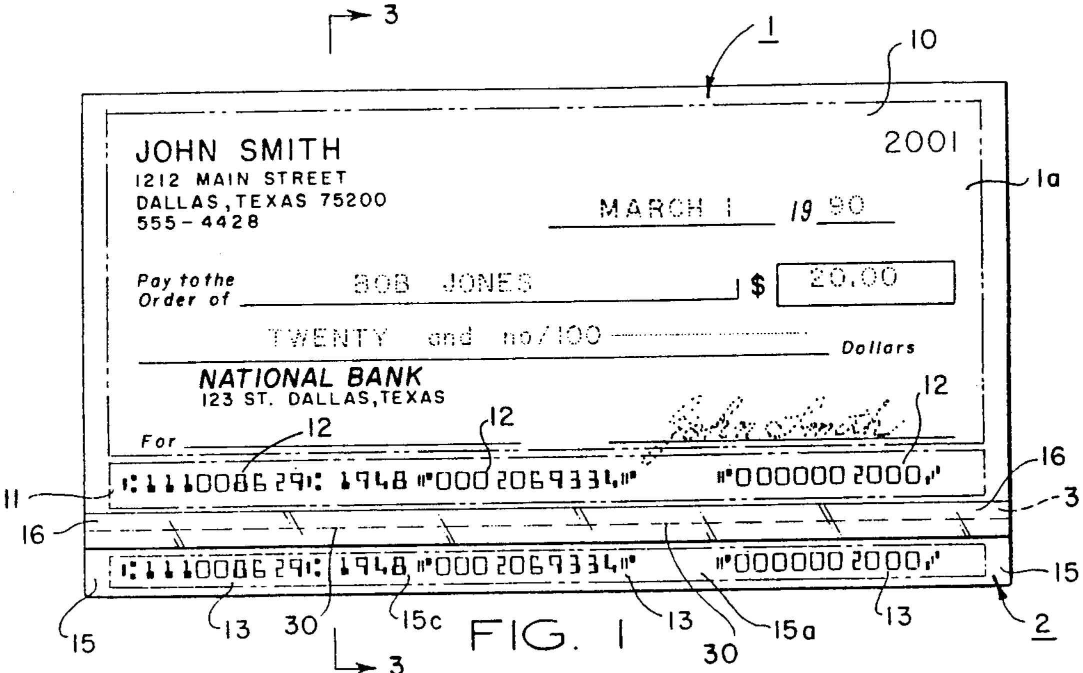
FIG. 1 is an elevation view of a conventional bank check to which the improved correction strip assembly of the present invention has been attached, the check and attached correction strip assembly both being viewed from the front.

Referring initially to FIG. 1, a conventional bank check 1 is depicted having at its lower edge 3 a correction strip assembly 2 constructed and attached in accordance with the present invention.

Initially, it is to be emphasized that while the document 1 has been described as bank check, this is only for illustrative purposes, and it is to be understood that the invention is applicable, for example, to many types of documents, particularly commercial instruments used for transfer of funds purposes, such as drafts, credit card receipts, bank deposit slips, etc.

Disposed upon the front face 1*a* of check 1, as is customary, is the characteristic pre-printed data such as bank name, account style, check number, payee line, payor signature line, etc., along with the filled in payee, check amount, and payor signature, all such information being located within a first information field 10.

Disposed adjacent, and along, the lower edge 3 of check 1 is a second area or field 11 in which a first set 12 of encoded indicia is disposed, such encoded indicia normally representing (from left to right) the bank routing number, account number, and check amount. This encoded indicia is ordinarily in the form of magnetic ink characters, one common form known as MICR characters, adapted to be scanned or "read" by apparatus on the market designed for this purpose. Another commonly known form are CMC-7 characters which can be magnetically and optically scanned.

As previously discussed, the encoded indicia 12 within the field 11 may be defectively printed, or the bank check itself may be torn such that all the MICR symbols would not be machine readable. Consequently, the correction strip assembly 2 normally provides an additional area in which a second set 13 of nondefective encoded indicia 13 may be printed corresponding to, and thus "correcting", the first set 12 of defective indicia, thereby enabling the automatic processing of the check. In addition, the strip assembly provides an area for encoding data in addition to, or in lieu of, that appearing in field 11.

Figure 2:
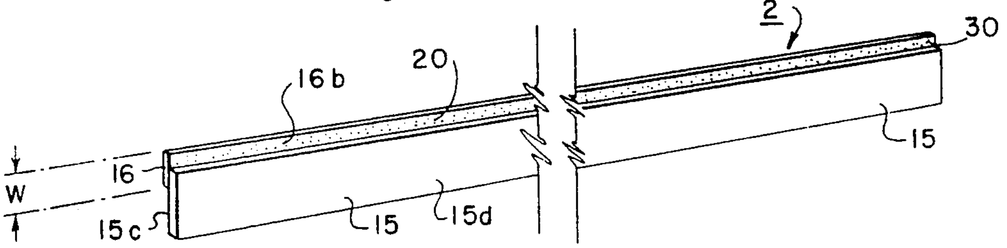
FIG. 2 is a perspective view of the unattached correction strip assembly of the present invention viewed from the rear of the assembly.

In accordance with a unique feature of this invention, and with additional reference now to FIG. 2, the correction strip assembly 2 comprises an encodable band portion 15 having a print zone 15*a* (FIG. 1) in which the encoded indicia 13 will be printed, the assembly further comprising an integrally formed adhesive bearing strip attachment portion 16 for attaching the encodable band 15 at the lower edge of the check 1. The strip attachment portion 16 includes an upper segment 16*b* which extends above the band 15 to provide an exposed adhesive bearing surface. In accordance with the preferred embodiment, the adhesive 20 is a heat-activatable thermoplastic material which, when heated, enables the adhesion of the exposed segment 16*b* to the check.

Figure 3:
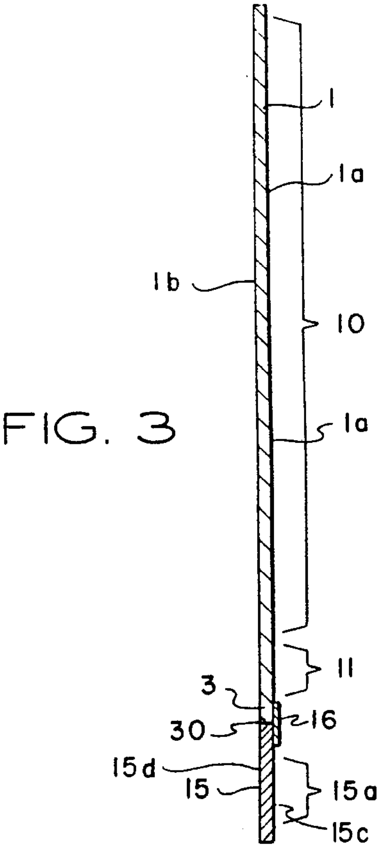
FIG. 3 shows a section of the assembly taken on line 3—3 of FIG. 1, looking in the direction of the arrows.

In accordance with the invention, the strip assembly 2 is affixed to the check with the adhesive bearing surface 16*b* being attached to the front face 1*a* of the check, with the encodable band portion 15 thus being positioned in edge abutting relationship to the check at the locus of intersection 30, with the front face 15*c* of the encodable band being aligned, and substantially coplanar, with the front face 1*a* of the check, as illustrated in FIG. 3.

In accordance with another unique feature of the invention the width and positioning of the strip attachment portion 16 is tightly controlled so that its upper segment which extends above the locus of intersection 30 does not extend into the encoding field 11 of the check, and furthermore does not extend downwardly into the print zone 15*a*, when the strip assembly 2 is affixed to the check.

Various materials and dimensions may be utilized for the encodable band portion 15 and strip attachment portion 16 of the correction strip assembly 2. In accordance with a preferred embodiment, however, the encodable band portion may be formed of 24# MICR bond paper, the latter being essentially of the same type and thickness as conventional checks, so that the back surface 15*d* of strip 15 is substantially coplanar with the back face 1*b* of the check.

The strip attachment portion 16 is preferably formed of thin, tearable super calendered paper preferably of approximately 0.0015" in thickness and coated with a suitable heat-activatable thermoplastic adhesive. The width "W" (FIG. 2) of the strip attachment portion 16 should be approximately ¼" to 5/16", with no more than approximately 3/16" extending above the locus of intersection 30 of band 15 with check 1, so as to avoid interference with the indicia printed in the field 11, and no more than approximately 2/16" extending below such locus of intersection, to avoid extending into the print zone 15*a* on the front face 15*c* (FIG. 1) of band 15.

In practice, a supply of the correction strip assembly 2 is provided in the form of a continuous ribbon or roll, from which the desired length of each strip is severed and adhesively sealed by heat to each check 1. While various types of equipment may be used for this purpose, it may be desirable to use suitably modified versions of the type of equipment disclosed in U.S. Pat. No. 3,897,299 and U.S. Pat. No. 4,448,631, such patents being assigned to the assignee of the present invention.

Accordingly, such apparatus is effective to affix each strip assembly at the front surface of the check (or other document) with the encodable band portion 15 being substantially aligned with, and along, the bottom edge of the check so as to position the print zone 15*a* immediately below the area or field 11. The exposed adhesive segment 16*b* is heat sealed to the front surface 1*a* of the check and, as previously described, extends at its upper boundary just below field 11, thus avoiding interference with the MICR reading operation of the indicia 12, and at its lower boundary, above print zone 15*a*, thus avoiding interference with MICR encoding of band 15. Since the adhesive strip 16 has been applied to the front, rather than the back, of the check, the strip does not interfere with printing on the back of the check during its processing. Furthermore, if desired, the entire rear surface 15*d* of the band 15 is available for printing.

As an alternate embodiment of the invention, and in order to facilitate the removal of the encodable band portion 15 from the check after its processing, a weakening device 40 such as notch, slit, semi-circle, etc. (FIG. 4) is provided at the locus of intersection 30 and only at one end of the correction strip check combination It is preferable that such weakening device be formed at what would be the trailing edge of the check during processing which, under ordinary processing schemes, is the edge near the bank routing number (at left in FIGS. 1 and 4). Since the strip is of tearable material, the device 40 facilitates the initiation of the tearing of band 15 from the check without damaging the check.

Figure 4:
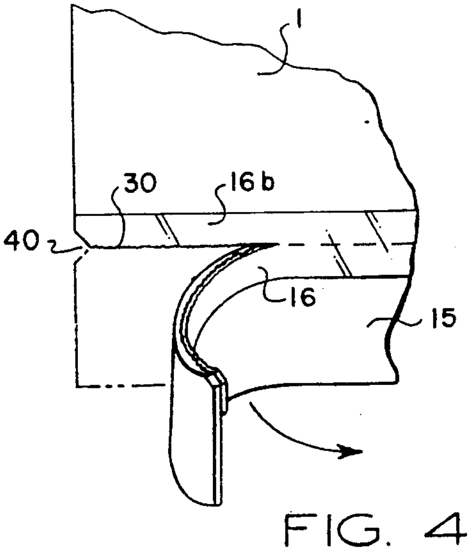
FIG. 4 is a partial front view of an alternate embodiment of the strip assembly with means provided for facilitating the removal of the encodable band portion from the check after processing.

In accordance with the normal check or document processing, a check having defective or insufficient coding within the field 11 is detected, either automatically or by the clerk reviewing the instrument. Thereafter, the strip assembly 2 of suitable length is attached to the check as shown in FIG. 1. Next, the encoded indicia 13 is then imprinted at the front surface 15*c* of band portion 15 within the print zone 15*a*. Thereafter, the check with the attached strip assembly 2 can be automatically processed in accordance with conventional and known techniques. After processing, the codable band portion 15 can be removed by tearing such along the locus of intersection 30 (as shown in FIG. 4), leaving the upper segment 16*b* of the strip attachment 16 affixed to the front face of the check.

Various modifications to the disclosed embodiments, as well as alternate embodiments of the invention may be come apparent to persons skilled in the art within departing from the spirit and scope of the invention as defined by the appended claims.

What is claimed is:

1. A modified instrument of the type used for the transfer of funds and to be automatically processed by apparatus which reads and decodes encoded indicia on the modified instrument, said modified instrument comprising, in combination, a. a generally rectangular shaped information bearing instrument having a pair of substantially parallel upper and lower longitudinal edges thereof, a first set of encoded indicia disposed upon a front face thereof along and adjacent the lower of said longitudinal edges within a first encoding zone, and b. an elongated strip assembly adhesively secured to said information bearing instrument, said assembly comprising an encodable band portion having a front face for imprinting, within a second encoding zone, a second set of encoded indicia, said encodable band portion being disposed immediately adjacent the said lower longitudinal edge and being in edge abutting relationship therewith;

c. said strip assembly also comprising a heat activatable adhesive bearing strip portion for adhesively and removably securing said encodable band portion to said instrument, said adhesive bearing strip portion extending between said information bearing instrument and said encodable band portion across the locus of intersection of said encodable band portion and said instrument, but terminating above the second encoding zone, said adhesive bearing strip portion being adhesively attached to said instrument at said lower edge and solely to said front face of said instrument;

d. said encodable band portion being tearable from said information bearing instrument along said locus of intersection after said instrument is automatically processed;

e. wherein the placement of the adhesive bearing strip portion at said front face reduces static build-up and the consequent shearing of said encodable band portion from the leading edge of said information bearing instrument during its transport through said apparatus, thereby to reduce fouling of the automatic processing of said instrument.

2. The modified instrument as defined by claim 1 in which said second set of encoded indicia is similar to said first set of encoded indicia.

3. The modified instrument as defined by claim 1 in which the front face of said information bearing instrument is substantially coplanar with the front face of said encodable band portion, and the back surface of the said information bearing instrument is substantially coplanar with the back surface of the encodable band portion.

4. The modified instrument as defined by claim 3 in which the entire back surface of said encodable band portion is available for imprinting.

5. The modified instrument as defined by claim 1 wherein said adhesive strip portion is of highly calendered paper.

6. The modified instrument as defined by claim 5 in which the adhesive bearing strip portion is thinner in a direction of a plane perpendicular to the plane of said front face than said encodable band portion thickness in the same said direction.

7. The modified instrument as defined by claim 1 wherein said heat activatable strip does not extend into the first encoding zone of the instrument.

8. The modified instrument as defined by claim 1 further comprising a weakening device provided at said locus of intersection but solely at one end of said instrument.

9. The modified instrument as defined by claim 8 in which said weakening device is a notch.

10. In a combination of (a) a check of the type used for the transfer of funds and being generally rectangular shaped with a pair of substantially parallel upper and lower longitudinal edges thereof and having a front face upon which a first set of encoded indicia is disposed along and adjacent the said lower edge thereof to facilitate the automatic processing of the check by apparatus which reads and decodes said encoded indicia, and (b) an encodable strip assembly adhesively secured to said check comprising (i) an encodable band portion having a front face for imprinting, within an encoding zone, a second set of encoded indicia and (ii) an adhesive bearing strip portion attached to said encodable band portion as well as adhesively attached to said check solely at said lower edge, the improvement wherein said adhesive bearing strip portion is adhesively attached to said check solely at the said front face of said check to thereby attach said encodable band portion to said check to provide an auxiliary encoding surface thereof, said adhesive bearing portion not extending into the encoding zone of the encodable band portion, and further wherein the placement of the adhesive bearing strip portion at said front face reduces static build-up and the consequent shearing of said encodable band portion from the leading edge of said check during its transport through said apparatus, thereby to reduce fouling of the automatic processing of said check.

11. The improvement as set out in claim 10 wherein both said first and second sets of encoded indicia are MICR encoded indicia, and wherein said adhesive bearing strip portion does not extend into said encoding zone.

* * * * *